R. WIKANDER.
ELECTRIC SWITCHING DEVICE.
APPLICATION FILED MAR. 23, 1911.
1,082,615.
Patented Dec. 30, 1913.
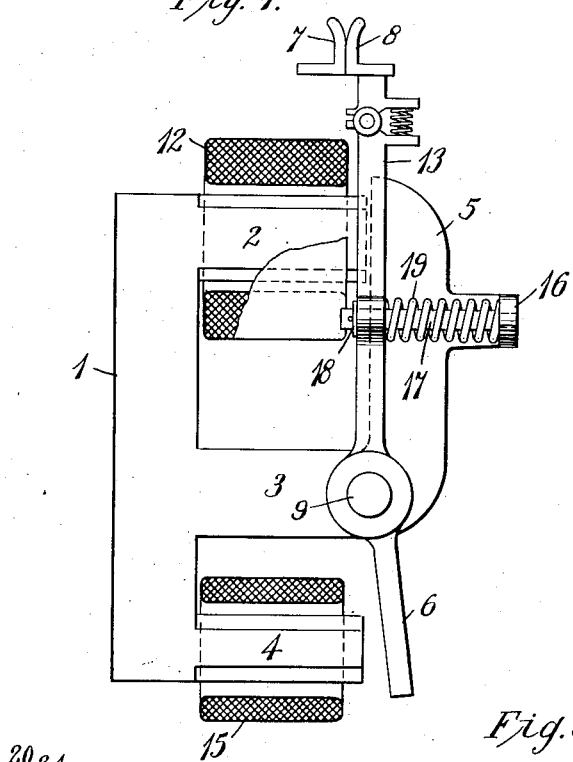
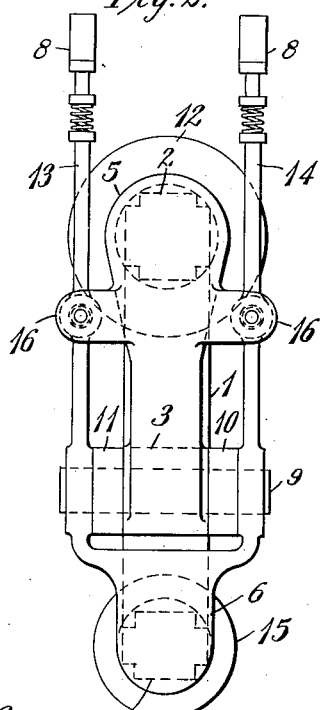
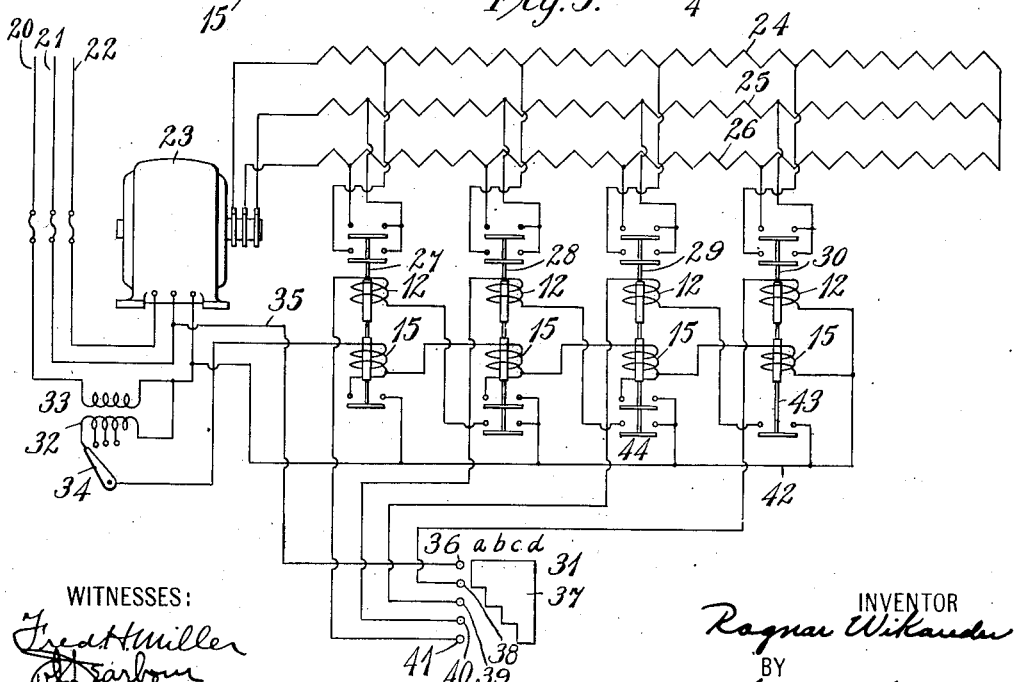
WITNESSES:
INVENTOR
Ragnar Wikander
BY
ATTORNEY

UNITED STATES PATENT OFFICE.

RAGNAR WIKANDER, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC SWITCHING DEVICE.

1,082,615.   Specification of Letters Patent.   Patented Dec. 30, 1913.

Application filed March 23, 1911.   Serial No. 616,477.

*To all whom it may concern:*

Be it known that I, RAGNAR WIKANDER, a subject of the King of Sweden, and a resident of Pittsburgh, in the county of Allegheny and State of Pennsylvania, have invented a new and useful Improvement in Electric Switching Devices, of which the following is a specification.

My invention relates to switches for electric circuits and it has special reference to such switches as are operated by electromagnets and are adapted for use in unit switch control systems for electric motors.

The object of my invention is to provide a switch of the class above indicated and a relatively simple system of electric motor control embodying the same.

In my co-pending application, Serial No. 616,478, filed March 23, 1911, I have shown and described an electrically operated switch provided with two opposed magnet coils, one of which tends to hold the switch in its open position.

According to my present invention, I provide a system of electric motor control embodying a plurality of switches possessing the characteristics above referred to, in which the acceleration of the motor is rapid or moderate, according to the current traversing the motor circuit, without utilizing a series relay or other means independent of the switches themselves for governing the rate of acceleration.

Figures 1 and 2, of the accompanying drawings, are, respectively, a side elevation, with certain of the parts in section, and a front view of an electrically operated switch, and Fig. 3 is a diagrammatic view of a control system for electric motors embodying a plurality of switches, each of which possesses the operating characteristics of that shown in Figs. 1 and 2.

Referring to Figs. 1 and 2 of the drawings, the structure here shown comprises a substantially E-shaped core member 1 having laterally projecting arms 2, 3 and 4, a principal movable core member 5, an auxiliary core member 6, stationary switch contact members 7 and movable switch contact members 8. The core member 5 is pivotally mounted on a shaft 9 which extends through and is supported by projections 10 and 11 of the intermediate arm 3 and is adapted to bridge the arms 2 and 3 when a coil 12, mounted on the arm 2, is energized. The auxiliary movable core member 6 is forked to provide arms 13 and 14 and is fulcrumed on the shaft 9, the arms being located at the respective sides of the core member 5. The body of the core member 6 is so arranged that it moves into engagement with the arm 4 of the stationary core member when a coil 15, which is mounted thereon, is sufficiently energized. The member 5 is provided with laterally extending lugs 16 from which rods 17 project inwardly in parallel lines through holes suitably located in arms 13 and 14. A washer or other enlargement 18 is provided at the inner end of each of the rods 17, and springs 19, which surround the rods, tend to fix the relative positions of the members 5 and 6. The movable contact members 8 are pivotally mounted upon the upper ends of the arms 13 and 14.

The operation of the switch is as follows: When the coil 12 is energized, one end of core member 5 is brought into engagement with the arm 2, and the switch contacts 7 and 8 are forced together unless the winding 15 is energized sufficiently to hold the switch open in opposition to the springs 19, by bringing the lower end of the member 6 into engagement with the arm 4. Assuming that both coils are energized and each of the movable core members is brought into engagement with an arm of the stationary member, it is evident that the switch will be closed by the action of the springs 19 as soon as the current in the winding 15 falls below a predetermined value.

Referring to Fig. 3 of the drawings, the system here shown comprises a polyphase alternating current supply circuit 20—21—22, a motor 23 having the usual external resistance 24, 25 and 26 in its secondary circuit and a series of independently operated switches 27, 28, 29 and 30. The acceleration of the motor is automatic but is also capable of manual control by means of a master switch 31 which is adapted to occupy any one of positions a, b, c, and d. Each of the switches 27, 28, 29 and 30 has the same operating characteristics as the switch shown in Figs. 1 and 2, the corresponding coils being marked with the same reference characters. The coils 15, which tend to hold the switches open, are connected in series circuit relation and are energized, in proportion to the current traversing the motor circuit, from the secondary winding 32 of a series transformer 33. The conditions under which the switches will be closed may be varied relative to the current in the primary winding of the motor by means of a regulator 34 which varies the number of active turns in the secondary winding 32.

The operation of the system is as follows: Assuming that the switches and other control devices found in the system occupy the positions shown in Fig. 3 of the drawings, if the master switch 31 is moved directly to the position d, the motor will be accelerated automatically by the successive closing of the switches 30, 29, 28 and 27 in the order named, the circuit connections being as follows: A control circuit is established from conductor 21, through conductor 35 to contact finger 36 of the master switch which, together with contact fingers 38, 39, 40 and 41, is in engagement with a contact segment 37. The fingers 38, 39, 40 and 41 are respectively connected to the coils 12 of the switches 30, 29, 28 and 27. The only circuit, which is at first completed, however, is established through the coil 12 of switch 30 and conductor 42 to line conductor 20. When this coil is energized, the switch tends to close and is only delayed by the current traversing the winding 15 of the same switch which, under ordinary conditions of operation, is relatively large until the motor has attained considerable speed. When the current traversing the winding 15 has sufficiently decreased, the switch 30 is closed, together with auxiliary switch 43, which is operatively connected thereto. When the switch 43 is closed, the circuit of the coil 12 of switch 29 is energized, its action being delayed as before, until the motor is further accelerated, since the current in the motor circuit is suddenly increased by the reduction of the secondary resistance which is effected by the switch 30. Auxiliary switch 44, which corresponds to the switch 43, completes the circuit for the coil 12 of the switch 28, when closed, and short circuits the coil 15 of the switch 30. The action of the switches 28 and 27 corresponds to that of the switch 29 and each is delayed by its coil 15 until the rush of current produced by the closing of the preceding switch is passed.

It is evident that, instead of bringing the motor gradually up to full speed, its speed may be regulated as desired by moving the controller 31 to occupy some of its intermediate positions a, b and c.

My invention is not restricted to the system illustrated, and I desire that only such limitations shall be imposed as are indicated in the appended claims.

I claim as my invention:

1. In a control system, the combination with an electric motor and a supply circuit therefor, of a plurality of independently operated accelerating switches adapted to close in a predetermined sequence, said switches having closing coils and series-connected coils which tend to prevent closing, and means for short circuiting the opposing coil of the preceding switch as each switch is closed.

2. In a control system, the combination with an electric motor and a supply circuit therefor, of a plurality of independently operated accelerating switches adapted to close in a predetermined sequence and having closing coils and coils that are dependent upon the current traversing the motor circuit and tend to prevent closing, the opposing coil of each switch being short circuited when the next succeeding switch is closed.

3. In a system of control, the combination with a polyphase alternating current motor, a supply circuit therefor, a series transformer connected in one branch of the supply circuit and a secondary resistance, of a plurality of independently operated switches for gradually short circuiting the secondary resistance, a master switch for controlling the closing of the switches, and means independent of the master switch for rendering closing of each switch dependent upon the closing of the preceding switch, opposing coils for the switches connected in series relation and energized from said series transformer, and auxiliary switches operatively connected to the main switches for short circuiting the opposing coil of the preceding switch as each switch is closed.

4. In a system of control, the combination with a polyphase alternating current motor, a supply circuit therefor and a secondary resistance, of a plurality of independently operated switches for gradually short circuiting the resistance, means for limiting the closing of said switches to a predetermined sequence, and coils for the respective switches that oppose the closing thereof in accordance with the current traversing the motor circuit.

5. In a system of control, the combination with a polyphase alternating current motor, a supply circuit therefor, and a secondary resistance, of a plurality of independently operated switches for gradually short circuiting the resistance, means for limiting the closure of said switches to a predetermined sequence, and a coil pertaining to each switch for opposing its closure that is energized in proportion to the current traversing the primary circuit of the motor.

6. A control system comprising a plurality of independently operated switches adapted to close sequentially and having closing coils and series-connected coils which tend to prevent closing, and means for rendering the opposing coil of the preceding switch ineffective as each switch is closed.

In testimony whereof, I have hereunto subscribed my name this 21st day of March, 1911.

RAGNAR WIKANDER.

Witnesses:
STANLEY STROUD,
B. B. HINES.